United States Patent
Ma et al.

(10) Patent No.: US 11,429,081 B2
(45) Date of Patent: Aug. 30, 2022

(54) TOOLPATH TOPOLOGY DESIGN METHOD BASED ON VECTOR FIELD IN SUB-REGIONAL PROCESSING FOR CURVED SURFACE

(71) Applicant: DALIAN UNIVERSITY OF TECHNOLOGY, Liaoning (CN)

(72) Inventors: Jianwei Ma, Liaoning (CN); Zhenyuan Jia, Liaoning (CN); Xiao Lu, Liaoning (CN); Wenwen Jiang, Liaoning (CN); Xiaoxuan Zhao, Liaoning (CN); Wei Liu, Liaoning (CN); Likun Si, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 239 days.

(21) Appl. No.: 16/753,206

(22) PCT Filed: Aug. 19, 2019

(86) PCT No.: PCT/CN2019/101266
§ 371 (c)(1),
(2) Date: Apr. 2, 2020

(87) PCT Pub. No.: WO2020/125040
PCT Pub. Date: Jun. 25, 2020

(65) Prior Publication Data
US 2021/0048791 A1    Feb. 18, 2021

(30) Foreign Application Priority Data
Dec. 17, 2018   (CN) .......................... 201811538557.5

(51) Int. Cl.
G05B 19/402    (2006.01)

(52) U.S. Cl.
CPC .. G05B 19/402 (2013.01); *G05B 2219/35167* (2013.01); *G05B 2219/37355* (2013.01)

(58) Field of Classification Search
CPC ........ G05B 19/402; G05B 2219/35167; G05B 2219/37355; G05B 19/4166; G05B 19/19; Y02P 90/02; B23C 3/00
See application file for complete search history.

(56) References Cited

U.S. PATENT DOCUMENTS

| 6,437,823 | B1 * | 8/2002 | Zhang | H04N 17/002 348/188 |
| 2008/0234852 | A1 * | 9/2008 | Wang | G05B 19/401 700/114 |
| 2011/0137463 | A1 | 6/2011 | Alcazar et al. | |

FOREIGN PATENT DOCUMENTS

| CN | 104281098 A | 1/2015 |
| CN | 106354098 A | 1/2017 |

(Continued)

OTHER PUBLICATIONS

Tuong et al., "A practical approach for partitioning free-form surfaces", International Journal of Computer Integrated Manufacturing, 2010, 23(11), 992-1001.

*Primary Examiner* — Kidest Bahta
(74) *Attorney, Agent, or Firm* — Muncy, Geissler, Olds & Lowe P.C.

(57) ABSTRACT

A toolpath topology design method based on vector field in sub-regional processing for the curved surface is disclosed which comprising: finding the functional relationships in feeding direction between the chord error and the normal curvature and between the scallop-height error and the normal curvature; establishing the bi-objective optimization model and calculating the optimal feeding direction at each cutting contact point within the surface through the constructed evaluation function, the space vector field is built;

(Continued)

calculating divergence and rotation of the projected vector field and according to whether them are zeros or not to classify different sub-regions, the primary surface segmentation is achieved, etc. The method is applied for the complex curved surface processing, which can reduce the machining error and enhance the feed motion stability.

1 Claim, 4 Drawing Sheets

(56) References Cited

FOREIGN PATENT DOCUMENTS

| | | |
|---|---|---|
| CN | 107145126 A | 9/2017 |
| CN | 107491034 A | 12/2017 |
| CN | 107562013 A | 1/2018 |
| CN | 108628247 A | 10/2018 |
| CN | 109358568 A | 2/2019 |
| JP | 2017156867 A | 9/2017 |

* cited by examiner

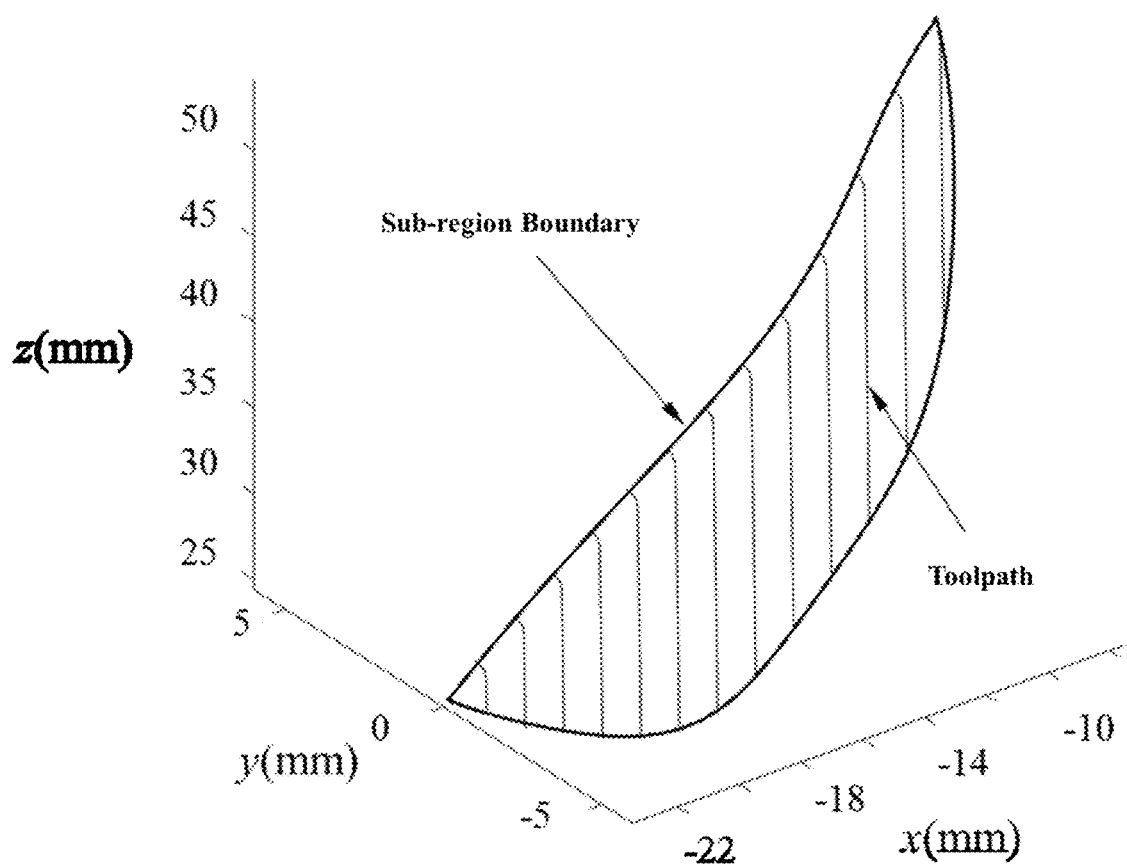
Figure 4
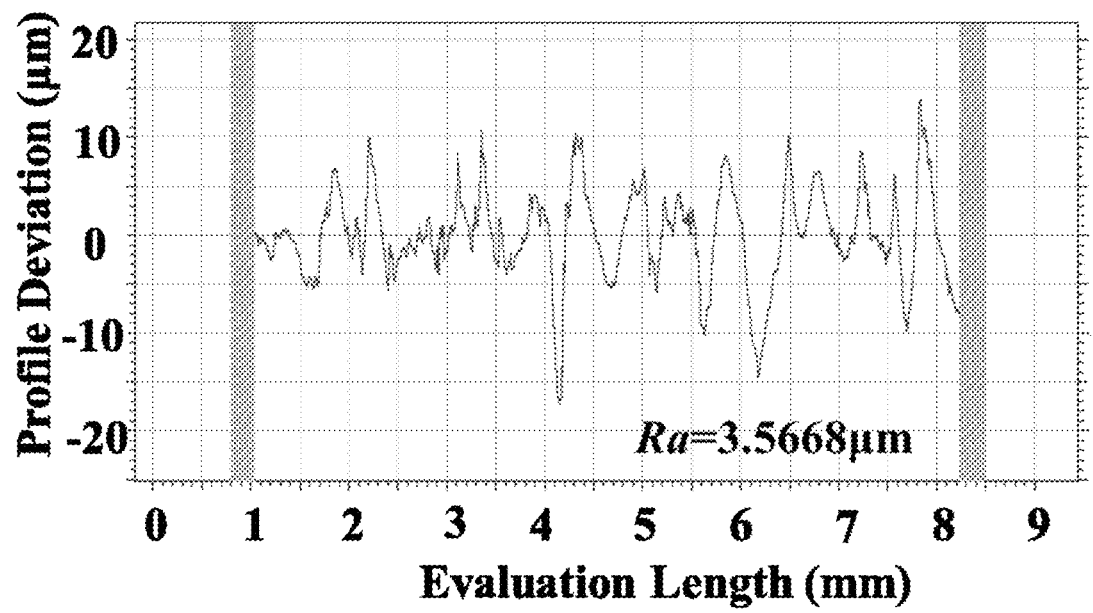
Figure 5-a)

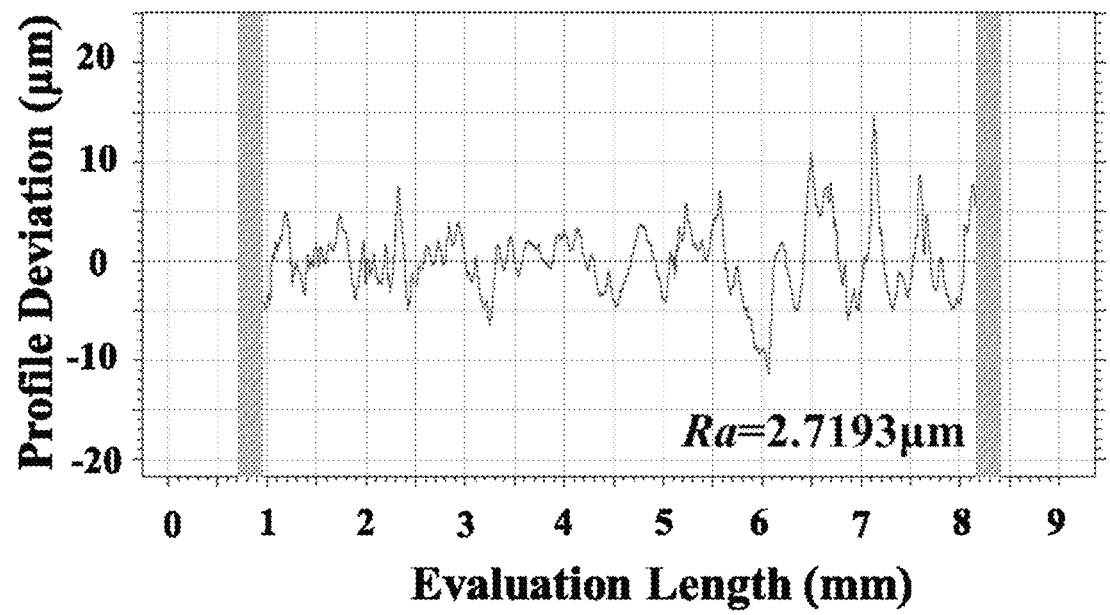
Figure 5-b)
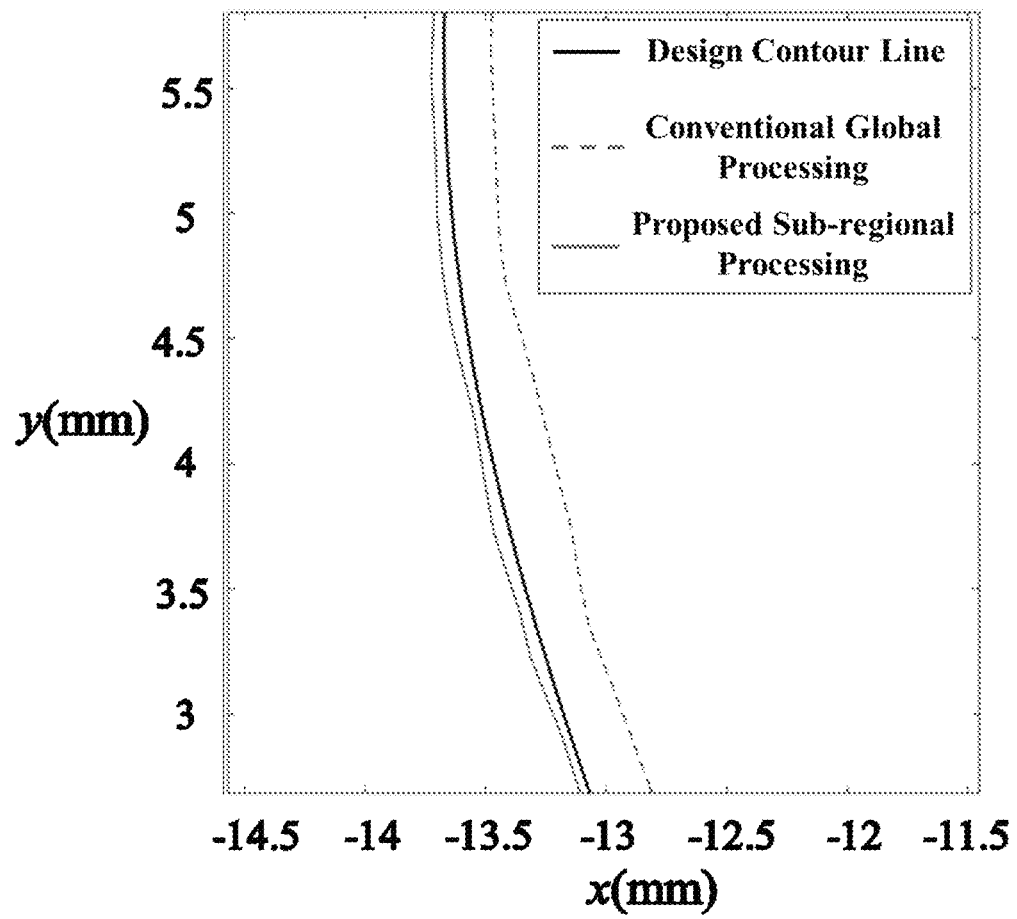
Figure 6

TOOLPATH TOPOLOGY DESIGN METHOD BASED ON VECTOR FIELD IN SUB-REGIONAL PROCESSING FOR CURVED SURFACE

TECHNICAL FIELD

This invention belongs to the field of high-precision and high-efficiency milling processing for complex curved surface parts, and relates to a toolpath topology design method based on vector field in sub-regional processing for the curved surface.

BACKGROUND

Currently, the extremely high requirements of machining accuracy for the complex curved surface parts have been put forward with the development of fields such as aerospace, energy power, automobile and ship, and the conventional global processing method with uniform processing parameters whose applicability has been reduced tends to uneven error distribution and local out-of-tolerance, which is difficult to apply to the high-precision processing for the complex curved surface parts. In order to meet the processing requirements of this kind of parts, the method of sub-regional processing is usually used, which means that the global processing region of the complex curved surface is segmented into sub-regions where the appropriate toolpaths are generated and the different processing parameters are set. The previous methods for surface segmentation are mainly focused on the surface curvature, normal vector, etc. to devise the criterion for surface segmentation, which has guiding significance on avoiding processing interference and improving machining efficiency. However, the existing criterions for surface segmentation are merely focused on the geometric feature of curved surface, lacking of the comprehensive consideration for the machining feeding mode and the feeding movement stability in sub-regional processing. Meanwhile, the surface segmentation and the toolpath generation are performed respectively, lacking of the support theory for the sub-regional toolpath topology generation, and this is easy to cause the local out-of-tolerance and the cutting vibration, which seriously restricts the comprehensive improvement of machining quality for the complex curved surface. Hence, a toolpath topology design method based on vector field in sub-regional processing for the curved surface is urgent needed to research to meet the high requirement of machining accuracy in sub-regional processing.

In the patent "Numerical control machining tool path partitioning mapping method considering error regional distribution", CN107145126A, proposed by Hao et al., the theoretical toolpath was generated based on the designed surface of part, and the initial processed surface of part was compared with the designed surface of part in order to find the error distribution features by which the processed surface of part was segmented. Selecting the proper toolpath mapping method on the sub-regions with different error features, the theoretical toolpath was mapped on the practical surface of part and the toolpath mapping was finished. However, the surface segmentation of this method is affected easily by the measuring error, and the method to compare the designed surface of part and the processed surface for surface segmentation is lack of the support theory, thus, this method for surface segmentation has a great limitation. In the paper "*A practical approach for partitioning free-form surfaces*", Tuong et al., International Journal of Computer Integrated Manufacturing, 2010, 23(11), 992-1001, a complex surface segmentation method based on the surface curvature was proposed. In this method, the Gaussian curvature and the average curvature at each point on the surface were calculated, and the processing region was segmented into concave sub-region, convex sub-region and saddle sub-region where different processing parameters were designed. The processing efficiency can be greatly promoted by this method, however, the feeding movement stability during processing is ignored and the toolpath topology design is lack of support theory, where the limitation is on.

SUMMARY

Aiming at solving the defects of the existing techniques, a toolpath topology design method based on vector field in sub-regional processing for the curved surface is invented. To solve the problem that there is lack of the comprehensive consideration for the machining feeding mode and the feed motion stability in sub-regional processing for the curved surface when surface segmentation and toolpath generation are performed, which is easy to cause local out-of-tolerance and obvious cutting vibration, the primary surface segmentation based on the distribution features of the feeding vectors and the surface subdivision for feeding movement stability are achieved according to the constructed vector field under the constraint of the chord error and the scallop-height error. By the result of surface segmentation, the sub-regional toolpath topology design for the complex curved surface is finished, which enhances machining accuracy and feeding motion stability effectively in sub-regional curved surface region processing, and provides technical support for high-precision and high-efficiency machining for the complex curved surface parts.

The technique solution used in the present invention is a toolpath topology design method based on vector field in sub-regional processing for the curved surface. The characteristics are as following, first, finding the functional relationships in feeding direction between the chord error and the normal curvature and between the scallop-height error and the normal curvature, after normalization, establishing the bi-objective optimization model and calculating the optimal feeding direction at each cutting contact point (CCP) within the surface through the constructed evaluation function, the space vector field is built, second, calculating divergence and rotation of the projected vector field and according to whether them are zeros or not to classify different sub-regions, the primary surface segmentation is achieved, third, after analyzing the feature of different vector fields and fitting of the streamline by feeding vectors, the kinematics parameters of when the rotational axes of machine tool feed along the streamlines are calculated and the surface subdivision is finished by judging the abrupt change of the kinematics parameters, finally, different sub-regional toolpath topologies for machining region are designed based on toolpath modes. The detail procedure is as follows.

Step One: Vector Field Construction for Tool Feeding Direction with Constraint of Chord Error and Scallop-Height Error The machining surface region can be defined as $S(u,v)=(x(u,v),y(u,v),z(u,v))$ in the Cartesian coordinate system O-xyz, where u and v are parameters for curved surface. When d and f are the determined step-size and step-size, the chord error e at any CCP on the toolpath for curved surface is calculated as, $$e = \begin{cases} 0, & k_f = 0 \\ \dfrac{1}{|k_f|} - \sqrt{\dfrac{1}{k_f^2} - \dfrac{f^2}{4}}, & k_f \neq 0 \end{cases} \quad (1)$$

Where, $k_f$ is the normal curvature in feeding direction.

The new variable e* is set as, $$e^* = k_f^2 \quad (2)$$

Solving the monotonicity of the chord error e and the new variable e* respectively, it can be seen that they are positively correlated, and therefore the chord error is substituted by e* in order to reduce the difficulty of subsequent calculations.

The scallop-height error h is calculated as, $$h = -\dfrac{d^2}{8}k_d + \dfrac{d^2}{8r} \quad (3)$$

Where, $k_d$ is the normal curvature in side-step direction and r is the effective milling cutter radius.

The feeding direction and the side-step direction are perpendicular to each other and according to the differential geometry, they satisfy Eq. (4), $$k_d + k_f = 2H \quad (4)$$

Where, H is the average curvature which is constant for any point within a certain complex curved surface.

By solving Eqs. (3)-(4), the scallop-height error can also be written as, $$h = \dfrac{d^2}{8}k_f + \dfrac{d^2 - 2Hrd^2}{8r} \quad (5)$$

According to Eqs. (2) and (5), given step-size and side-step, the values of the chord error and the scallop-height error are determined only by the normal curvature in feeding direction. In order to calculate the optimal feeding direction at each CCP, the bi-objective optimization model is constructed taking two types of error as objective function.

The two types of error should be normalized as, $$\begin{cases} e_n = \dfrac{e^* - e^*_{min}}{e^*_{max} - e^*_{min}} \\ h_n = \dfrac{h - h_{min}}{h_{max} - h_{min}} \end{cases} \quad (6)$$

Where, $e_n$ and $h_n$ are the normalized chord error and the normalized scallop-height error, $e^*_{min}$ and $e^*_{max}$ are the minimum and maximum of the chord error, and $h_{min}$ and $h_{max}$ are the minimum and maximum of the scallop-height error. The calculations for them are as followings.

The principal curvatures of the complex curved surface are represented as $k_1$ and $k_2$ ($k_1 > k_2$), which can be expressed as, $$\begin{cases} k_1 = H + \sqrt{H^2 - K} \\ k_2 = H - \sqrt{H^2 - K} \end{cases} \quad (7)$$

Where, K is the Gaussian curvature which is constant for any CCP on a certain curved surface.

According to Eqs. (2) and (5), the maximum and the minimum of the scallop-height error are calculated as, $$\begin{cases} h_{max} = \dfrac{d^2}{8}k_1 + \dfrac{d^2 - 2Hrd^2}{8r} \\ h_{min} = \dfrac{d^2}{8}k_2 + \dfrac{d^2 - 2Hrd^2}{8r} \end{cases} \quad (8)$$

The maximum of the chord error is calculated as, $$e^*_{max} = \begin{cases} k_1^2, & k_2 \geq 0 \\ k_1^2, & -k_1 \leq k_2 < 0 \\ k_2^2, & 0 \leq k_1 < -k_2 \\ k_2^2, & k_1 < 0 \end{cases} \quad (9)$$

The minimum of the chord error is calculated as, $$e^*_{min} = \begin{cases} k_2^2, & k_2 \geq 0 \\ 0, & -k_1 \leq k_2 < 0 \\ 0, & 0 \leq k_1 < -k_2 \\ k_1^2, & k_1 < 0 \end{cases} \quad (10)$$

By solving Eqs. (6)-(10), the normalized scallop-height error $h_n$ is calculated as, $$h_n = \dfrac{1}{k_1 - k_2}k_f - \dfrac{k_2}{k_1 - k_2} \quad (11)$$

The normalized chord error $e_n$ is calculated as, $$e_n = \begin{cases} \dfrac{1}{k_1^2 - k_2^2}k_f^2 - \dfrac{k_2^2}{k_1^2 - k_2^2}, & k_2 \geq 0 \\ \dfrac{1}{k_1^2}k_f^2, & -k_1 \leq k_2 < 0 \\ \dfrac{1}{k_2^2}k_f^2, & 0 \leq k_1 < -k_2 \\ \dfrac{1}{k_2^2 - k_1^2}k_f^2 - \dfrac{k_1^2}{k_2^2 - k_1^2}, & k_1 < 0 \end{cases} \quad (12)$$

To simplify the description, the normalized errors are used in the following paragraphs. The bi-objective optimization model taking two types of error as objective function is constructed as, $V\text{-min}(e_n, h_n)$ s.t. $k_2 \leq k_f \leq k_1$ \quad (13)

Where, V-min means vector minimization, that is the sub-objective functions $e_n$ and $h_n$ for vector objective are as minimized as possible.

Using the linear weighted sum method, an evaluation function Q can be constructed as, min $Q = \alpha_1 e_n + \alpha_2 h_n$ s.t. $k_2 \leq k_f \leq k_1$ \quad (14)

Where, the weights of the evaluation function of chord error and scallop-height error, $\alpha_1$ and $\alpha_2$, are calculated as, $$\begin{cases} \alpha_1 = \dfrac{h_{n1} - h_{n\,min}}{(e_{n1} - e_{n\,min}) + (h_{n1} - h_{n\,min})} \\ \alpha_2 = \dfrac{e_{n1} - e_{n\,min}}{(e_{n1} - e_{n\,min}) + (h_{n1} - h_{n\,min})} \end{cases} \quad (15)$$

Where, $h_{n1}$ is the scallop-height error when the chord error is minimized and $e_{n1}$ is the chord error when the scallop-height error is minimized. $e_{n\,min}$ and $h_{n\,min}$ are the minimum values of the chord error and the scallop-height error.

The classified discussion by the value range of the principal curvature for the bi-objective optimization model is as followings.

(1) When $k_2 \geq 0$, assigned $k_f = k_2$, $e_n$ and $h_n$ are minimized simultaneously, thus, the optimal solution $k_f$ for the bi-objective optimization is $k_f = k_2$. By the Euler Theorem as, $$k_f = k_1 \cos^2\theta + k_2 \sin^2\theta \quad (16)$$

Where, $\theta$ is the angle between the feeding direction and the corresponding main direction. In $$\theta = \frac{\pi}{2}.$$

(2) When $-k_1 \leq k_2 < 0$, the evaluation function Q is, $$Q = \frac{1}{k_1^2 + k_2^2 - k_1 k_2}(k_f^2 - k_2 k_f + k_2^2) \quad (17)$$

Assigned $$k_f = \frac{k_2}{2},$$

Q is minimized, thus, the optimal solution $k_f$ for the bi-objective optimization is $$k_f = \frac{k_2}{2}.$$

In this case, $$\theta = \arcsin\sqrt{\frac{k_2 - 2k_1}{2k_2 - 2k_1}}.$$

(3) When $0 \leq k_1 < -k_2$, the evaluation function Q is, $$Q = \frac{1}{k_1 - 2k_2}\left(-\frac{1}{k_2}k_f^2 + k_f - k_2\right) \quad (18)$$

Assigned $$k_f = \frac{k_2}{2}, Q$$

is minimized, thus, the optimal solution $k_f$ for the bi-objective optimization is $$k_f = \frac{k_2}{2}.$$

In this case, $$\theta = \arcsin\sqrt{\frac{k_2 - 2k_1}{2k_2 - 2k_1}}.$$

(4) When $k_1 < 0$, the evaluation function Q is, $$Q = \frac{1}{2(k_2 - k_1)}\left(\frac{1}{k_2 + k_1}k_f^2 - k_f + k_2 - \frac{k_1^2}{k_2 + k_1}\right) \quad (19)$$

Assigned $$k_f = \frac{k_1 + k_2}{2},$$

Q is minimized, thus, the optimal solution $k_f$ for the bi-objective optimization is $$k_f = \frac{k_1 + k_2}{2}.$$

In this case, $$\theta = \frac{\pi}{4}.$$

The arbitrary tangent vector direction is expressed as (du:dv), and the first fundamental form and the second fundamental form in this direction are defined as, $$\begin{cases} I = Edu^2 + 2Fdudv + Gdv^2 \\ II = Ldu^2 + 2Mdudv + Ndv^2 \end{cases} \quad (20)$$

Where, E, F and G are the first fundamental quantities for curved surface, and L, M and N are the second fundamental quantities for curved surface. They are expressed as, $$\begin{cases} E = S_u^2 \\ F = S_u \cdot S_v \\ G = S_v^2 \\ L = S_{uu} \cdot n \\ M = S_{uv} \cdot n \\ N = S_{vv} \cdot n \end{cases} \quad (21)$$

Where, $S_u$ and $S_v$ are first-order partial derivatives for curved surface $S(u,v)$, $S_{uu}$, $S_{uv}$ and $S_{vv}$ second-order partial derivatives for curved surface $S(u,v)$, n is the normal vector of the curved surface $S(u,v)$.

The direction of the maximum normal curvature is expressed as $(du^1 : dv^1)$, which is calculated as, $$\frac{du^1}{dv^1} = \frac{k_1 F - M}{L - k_1 E} \quad (22)$$

The direction of the optimal feeding direction is expressed as (du*:dv*), which is calculated as, $$\frac{du^*}{dv^*} = \frac{-b + \sqrt{b^2 - 4ac}}{2a} \quad (23)$$

Where, a, b and c are expressed as, $$\begin{cases} a = (F^2 - EG\cos^2\theta)\left(\frac{dv^1}{du^1}\right)^2 + 2EF\sin^2\theta\left(\frac{dv^1}{du^1}\right) + E^2\sin^2\theta \\ b = 2FG\sin^2\theta\left(\frac{dv^1}{du^1}\right)^2 + 2(EG + F^2\sin^2\theta - F^2\cos^2\theta)\left(\frac{dv^1}{du^1}\right) + 2EF\sin^2\theta \\ c = G^2\sin^2\theta\left(\frac{dv^1}{du^1}\right)^2 + 2FG\sin^2\theta\left(\frac{dv^1}{du^1}\right) + (F^2 - EG\cos^2\theta) \end{cases} \quad (24)$$

Solving Eqs. (22)-(24), the optimal feeding direction at each CCP is calculated, along which the unit feeding vector is established, and the vector filed under the constraint of chord error and scallop-height error is constructed.

Step Two: Primary Surface Segmentation Based on Vector Field of Tool Feeding Direction The expression of the vector field in the Cartesian coordinate system O-xyz is $F(\gamma)=(g_1(x,y,z), g_2(x,y,z), g_3(x,y,z))$ according to Step One, where γ is the feeding vector in optimal feeding direction of each point on the surface. Projecting the space vector field into plane xOy, the two-dimensional unit feeding vector γ* in each optimal feeding direction is obtained, and the plane vector field is expressed as $A(\gamma^*)=(f_1(x,y),f_2(x,y))$. The optimal feeding directions have regional distribution feature in the constructed vector field of tool feeding direction for the complex curved surface. Focusing on the vector field constructed by feeding vectors with sub-regional distribution feature, the primary surface segmentation is achieved based on distribution of tool feeding vector.

According to the divergence and the rotation of the vector filed, the regional distribution feature of the feeding vectors can be confirmed. The divergence divA(γ*) at each point on the plane vector field $A(\gamma^*)=(f_1(x,y), f_2(x,y))$ is calculated as, $$divA(\gamma^*) = \nabla \cdot A(\gamma^*) = \frac{\partial f_1(x, y)}{\partial x} + \frac{\partial f_2(x, y)}{\partial y} \quad (25)$$

Where, ∇ is the Hamilton operator.
The rotation rotA(γ*) at each point is calculated as, $$rot A(\gamma^*) = \nabla \times A(\gamma^*) = \left(\frac{\partial f_2(x, y)}{\partial x} - \frac{\partial f_1(x, y)}{\partial y}\right)k \quad (26)$$

Where, k is the unit vector in positive direction of z coordinate axis in Cartesian coordinate system.

Calculating the divergence and the rotation at each CCP on the curved surface, according to whether the values of the divergence and the rotation are zero or not, the plane vector field is divided into four categories.

(1) Irrotational Divergence-Free Vector Field
All the values of divergence and rotation are zero in such plane vector field, and the distribution feature of these feeding vectors is parallel.

(2) Rotational Vector Field
All the values of divergence are zero but the values of rotation are nonzero in such plane vector field, and the distribution feature of these feeding vectors is swirling.

(3) Divergence Vector Field
All the values of rotation are zero but the values of divergence are nonzero in such plane vector field, and the distribution feature of these feeding vectors is radialized.

(4) Rotational Divergence Vector Field
All the values of divergence and rotation are nonzero in such plane vector field, and the distribution feature of these feeding vectors is disorderly.

Calculating the values of the divergence and the rotation for the plane vector field, the projected plane vector field categories of different sub-regions are confirmed. Mapping the abrupt change points onto the machining region of the complex curved surface and fitting curve as boundaries for different sub-regions, the primary surface segmentation based on the vector field of tool feeding direction is achieved.

Step Three: Surface Subdivision for Guaranteeing Stability of Feed Motion

According to the primary surface segmentation in Step Two, the streamlines in different sub-regions can be fitted by the space vector field. The surface subdivision is carried out based on the kinematics parameters when axes of machine tool feed along the space vector field streamlines, which guarantees the stability of feed motion.

The five-axis CNC machine with AC Type dual rotary table is taken as an example, whose rotation axis of the rotary table A is parallel to the X-axis of the machine coordinate system and the rotation axis of the rotary table C is parallel to the Z-axis of the machine coordinate system. The vector field streamline in the machining region is set as r(ξ), where ξ is the parameter by arc length of the streamline equation. The tool orientation $n(\xi)=(n_x(\xi), n_y(\xi), n_z(\xi))$ which is the normal vector of the streamline on the sub-region of the complex curved surface is calculated as, $$n(\xi) = \frac{S_u(u(\xi), v(\xi)) \times S_v(u(\xi), v(\xi))}{|S_u(u(\xi), v(\xi)) \times S_v(u(\xi), v(\xi))|} \quad (27)$$

Where, $S_u(u(\xi),v(\xi))$ and $S_v(u(\xi),v(\xi))$ are the first-order partial derivative in the streamline of the complex curved surface S(u,v).

According to the tool orientations at each point on the streamline, the rotation angles of A-axis and C-axis of the machine tool are calculated as, $$\begin{cases} \beta_A(\xi) = \arctan\left(\frac{\sqrt{n_x(\xi)^2 + n_y(\xi)^2}}{n_z}\right) \\ \beta_C(\xi) = \arctan\left(\frac{n_x(\xi)}{n_y(\xi)}\right) \end{cases} \quad (28)$$

Based on Eqs. (27) and (28), the angular velocities of the A-axis and the C-axis of machine tool feeding along the streamline are calculated as, $$\begin{cases} \omega_A(\xi) = \dfrac{d\beta_A(\xi)}{dt} = \dfrac{d\xi}{dt} \cdot \dfrac{d\beta_A(\xi)}{d\xi} = v \cdot \dfrac{d\beta_A(\xi)}{d\xi} \\ \omega_C(\xi) = \dfrac{d\beta_C(\xi)}{dt} = \dfrac{d\xi}{dt} \cdot \dfrac{d\beta_C(\xi)}{d\xi} = v \cdot \dfrac{d\beta_C(\xi)}{d\xi} \end{cases} \quad (29)$$

Where, t is the processing time and v is the feed speed set.

The angular accelerations of the A-axis and the C-axis of machine tool feeding along the streamline are calculated as, $$\begin{cases} \alpha_A(\xi) = \dfrac{d\omega_A(\xi)}{dt} = v^2 \cdot \dfrac{d^2\beta_A(\xi)}{d\xi^2} \\ \alpha_C(\xi) = \dfrac{d\omega_C(\xi)}{dt} = v^2 \cdot \dfrac{d^2\beta_C(\xi)}{d\xi^2} \end{cases} \quad (30)$$

The angular velocities $\omega(\xi)$ and the angular accelerations $\alpha(\xi)$ of the rotation axes of the machine tool are calculated as, $$\begin{cases} |\omega(\xi)| = \sqrt{\omega_A(\xi)^2 + \omega_C(\xi)^2} \\ |\alpha(\xi)| = \sqrt{\alpha_A(\xi)^2 + \alpha_C(\xi)^2} \end{cases} \quad (31)$$

In order to avoid obvious cutting vibration when the rotation axes of machine tool feed along the streamlines, the angular velocities and the angular accelerations in sub-regions should meet the requirements as, $$\begin{cases} \left|\dfrac{d\omega(\xi)}{d\xi}\right| \le \dfrac{\sigma}{s} \int_0^s \left|\dfrac{d\omega(\xi)}{d\xi}\right| d\xi \\ \left|\dfrac{d\alpha(\xi)}{d\xi}\right| \le \dfrac{\sigma}{s} \int_0^s \left|\dfrac{d\alpha(\xi)}{d\xi}\right| d\xi \end{cases} \quad (32)$$

Where, σ is a stability coefficient to be set from 1 to 5, which is proportional to the feeding motion stability, and s is the total arc length of the streamline.

Evaluating the feeding motion stability by Eq. (32), take the points which are not fit this Eq. as the abrupt change points. Based on the primary surface segmentation and fitting these abrupt change points in sub-regions as new boundaries, the surface subdivision which guarantees the feeding motion stability is finished.

Step Four: Design of Sub-Regional Toolpath Topology for Curved Surface

The complex curved surface can be segmented and subdivided into different sub-regions where the feeding vectors are in regular distribution feature and the feeding motion stability is guaranteed when axes of machine tool feed along the space vector field streamlines according to Step Two and Step Three.

Based on the plane field type in different sub-regions, two frequently-used toolpath modes, direction-parallel machining and contour-parallel machining are designed on the plane fields projected by corresponding sub-regions as followings.

(1) Irrotational Divergence-Free Vector Field

The feeding vectors in such plane vector field present a parallel form, thus, the direction-parallel machining is designed. Fitting the vectors at each point as streamlines, the direction-parallel toolpaths are generated.

(2) Rotational Vector Field

The feeding vectors in such plane vector field present as the vorticity form. When the boundaries of sub-regions are parallel to corresponding vector field streamlines, the streamlines are closed vortex lines and the contour-parallel machining is designed. When the boundaries of sub-regions are not parallel to corresponding vector field streamlines, the streamlines are incomplete vortex lines as the circle regions, and the direction-parallel machining is designed. Taking the vector at each point as the tangent direction of the toolpath and fitting the streamline, the gyrate toolpaths are generated.

(3) Divergence Vector Field

The feeding vectors in such plane vector field present a radial form, thus, the direction-parallel machining is designed. Taking the vector at each point as the tangent direction of the toolpath and fitting the streamline, the radial toolpaths are generated.

(4) Rotational Divergence Vector Field

Due to the feature of disorderly distribution, the machining sub-region of the rotational divergence vector field is unpractical for direction-parallel or contour-parallel machining. Hence, the rotational divergence vector field need to be converted into irrotational divergence-free vector field. Based on the parallel form presented by the irrotational divergence-free vector field, the feeding vectors in rotational divergence vector field are modified as followings.

Taking m unit feeding vectors from the rotational divergence vector field $B(\gamma^*)=(f_1(x,y),f_2(x,y))$ to be converted, the vectors are respectively expressed as $B(\gamma_i^*)=(f_1(x,y),f_2(x_i,y_i))$, where i=1, 2, ..., m. The average of feeding vectors $\overline{B}(\gamma^*)$ is taken as the feeding vector in modified rotational divergence vector field, calculated as, $$\overline{B}(\gamma^*) = \left( \cos\left[\dfrac{1}{m}\sum_{i=1}^m \arccos f_1(x_i, y_i)\right], \sin\left[\dfrac{1}{m}\sum_{i=1}^m \arccos f_1(x_i, y_i)\right] \right) \quad (33)$$

Taking the modified vector at each point as the tangent direction of the toolpath and fitting the streamline, the direction-parallel toolpaths are generated.

Designing the plane toolpath topologies on plane fields corresponded with different sub-regions and mapping the plane toolpaths onto the machining region for curved surface, the space toolpaths are generated and the toolpath topology design in sub-regional processing based on vector field is realized.

The beneficial effects of the invented method are summarized below. This method is a design method of toolpath topology based on the vector field of tool feeding direction in sub-regional processing. To solve the problems that the existing methods for surface segmentation and toolpath generation in sub-regional processing for the curved surface are lack of the comprehensive consideration of feeding direction and kinematics performance of the machine tool, which results in local out-of-tolerance and obvious cutting vibration, a vector field is constructed by the optimal feeding direction with the constraint of chord error and scallop-height error. The primary surface segmentation based on the regional distribution feature of the feeding vectors and the surface subdivision for the feeding motion stability are realized. The toolpath topologies are finally generated in sub-regions. The method proposed can reduce the machining errors in sub-regional processing effectively and enhance the stability of feeding motion, which provides technical support for high-precision and high-efficiency machining of the complex curved surface parts.

DESCRIPTION OF THE DRAWINGS

FIG. 4: One of designed sub-regional toolpath topologies.

FIG. 5: a) Surface roughness by conventional global processing method; b) Surface roughness by proposed sub-regional processing method; where Ra is expressed as surface roughness (μm).

FIG. 6: Comparison for surface profile by conventional global processing method and proposed sub-regional processing method measured by coordinate measuring machine.

DETAILED DESCRIPTION

The specific embodiments of the present invention will be described in detail in combination with the technical solutions and the drawings.

Figure 1:
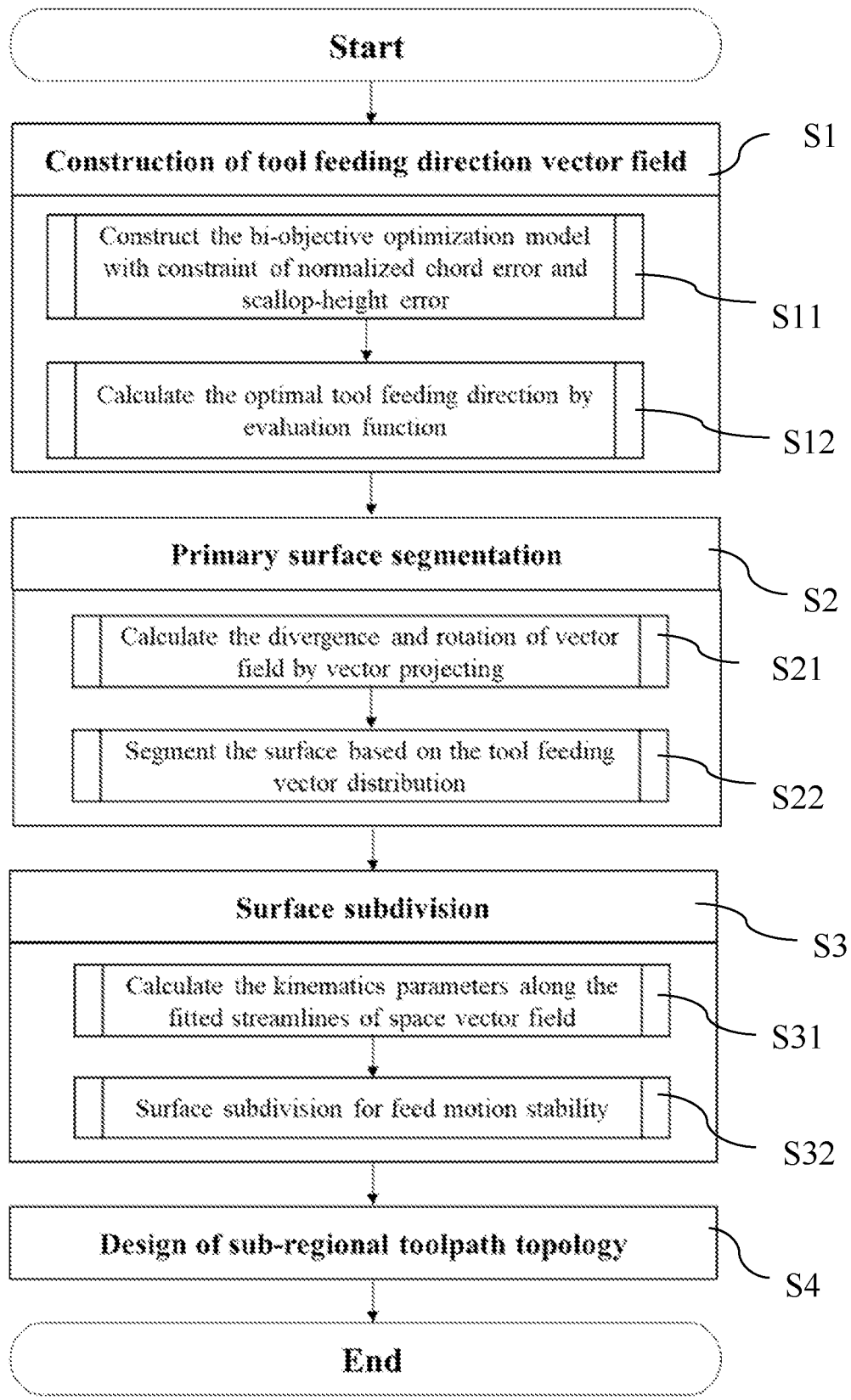
FIG. 1: Overall flow diagram of the invented method.

To solve the problems that the existing methods for surface segmentation and toolpath generation in sub-regional processing for the curved surface are lack of the comprehensive consideration of feeding direction and kinematics performance of the machine tool, which results in local out-of-tolerance and obvious cutting vibration and seriously affects the processing quality, a design method of toolpath topology based on the vector field of tool feeding direction in sub-regional processing is proposed in order to enhance the machining precision and the feed motion stability in sub-regional processing. FIG. 1 is the overall flow diagram of the invented method.

The detail procedure is as follows.

Step One (S1): Vector Field Construction for Tool Feeding Direction with Constraint of Chord Error and Scallop-Height Error Construct the Bi-Objective Optimization Model with Constraint of Normalized Chord Error and Scallop-Height Error (S11)

The machining surface region can be defined as $S(u,v)=(x(u,v),y(u,v),z(u,v))$ in the Cartesian coordinate system O-xyz, where u and v are parameters for curved surface. When d and f are the determined step-size and step-size, the chord error e at any CCP on the toolpath for curved surface is calculated as, $$e = \begin{cases} 0, & k_f = 0 \\ \frac{1}{|k_f|} - \sqrt{\frac{1}{k_f^2} - \frac{f^2}{4}}, & k_f \neq 0 \end{cases} \quad (1)$$

Where, $k_f$ is the normal curvature in feeding direction.

The new variable e* is set as, $$e^* = k_f^2 \quad (2)$$

Solving the monotonicity of the chord error e and the new variable e* respectively, it can be seen that they are positively correlated, and therefore the chord error is substituted by e* in order to reduce the difficulty of subsequent calculations.

The scallop-height error h is calculated as, $$h = -\frac{d^2}{8}k_d + \frac{d^2}{8r} \quad (3)$$

Where, $k_d$ is the normal curvature in side-step direction and r is the effective milling cutter radius.

The feeding direction and the side-step direction are perpendicular to each other and according to the differential geometry, they satisfy Eq. (4), $$k_d + k_f = 2H \quad (4)$$

Where, H is the average curvature which is constant for any point within a certain complex curved surface.

By solving Eqs. (3)-(4), the scallop-height error can also be written as, $$h = \frac{d^2}{8}k_f + \frac{d^2 - 2Hrd^2}{8r} \quad (5)$$

According to Eqs. (2) and (5), given step-size and side-step, the values of the chord error and the scallop-height error are determined only by the normal curvature in feeding direction. In order to calculate the optimal feeding direction at each CCP, the bi-objective optimization model is constructed taking two types of error as objective function.

The two types of error should be normalized as, $$\begin{cases} e_n = \frac{e^* - e^*_{min}}{e^*_{max} - e^*_{min}} \\ h_n = \frac{h - h_{min}}{h_{max} - h_{min}} \end{cases} \quad (6)$$

Where, $e_n$ and $h_n$ are the normalized chord error and the normalized scallop-height error, $e^*_{min}$ and $e^*_{max}$ are the minimum and maximum of the chord error, and $h_{min}$ and $h_{max}$ are the minimum and maximum of the scallop-height error. The calculations for them are as followings.

The principal curvatures of the complex curved surface are represented as $k_1$ and $k_2$ ($k_1 > k_2$), which can be expressed as, $$\begin{cases} k_1 = H + \sqrt{H^2 - K} \\ k_2 = H - \sqrt{H^2 - K} \end{cases} \quad (7)$$

Where, K is the Gaussian curvature which is constant for any CCP on a certain curved surface.

According to Eqs. (2) and (5), the maximum and the minimum of the scallop-height error are calculated as, $$\begin{cases} h_{max} = \frac{d^2}{8}k_1 + \frac{d^2 - 2Hrd^2}{8r} \\ h_{min} = \frac{d^2}{8}k_2 + \frac{d^2 - 2Hrd^2}{8r} \end{cases} \quad (8)$$

The maximum of the chord error is calculated as, $$e_{max}^* = \begin{cases} k_1^2, & k_2 \geq 0 \\ k_1^2, & -k_1 \leq k_2 < 0 \\ k_2^2, & 0 \leq k_1 < -k_2 \\ k_2^2, & k_1 < 0 \end{cases} \quad (9)$$

The minimum of the chord error is calculated as, $$e_{min}^* = \begin{cases} k_2^2, & k_2 \geq 0 \\ 0, & -k_1 \leq k_2 < 0 \\ 0, & 0 \leq k_1 < -k_2 \\ k_1^2, & k_1 < 0 \end{cases} \quad (10)$$

By solving Eqs. (6)-(10), the normalized scallop-height error $h_n$ is calculated as, $$h_n = \frac{1}{k_1 - k_2} k_f - \frac{k_2}{k_1 - k_2} \quad (11)$$

The normalized chord error $e_n$ is calculated as, $$e_n = \begin{cases} \frac{1}{k_1^2 - k_2^2} k_f^2 - \frac{k_2^2}{k_1^2 - k_2^2}, & k_2 \geq 0 \\ \frac{1}{k_1^2} k_f^2, & -k_1 \leq k_2 < 0 \\ \frac{1}{k_2^2} k_f^2, & 0 \leq k_1 < -k_2 \\ \frac{1}{k_2^2 - k_1^2} k_f^2 - \frac{k_1^2}{k_2^2 - k_1^2}, & k_1 < 0 \end{cases} \quad (12)$$

To simplify the description, the normalized errors are used in the following paragraphs. The bi-objective optimization model taking two types of error as objective function is constructed as, $V\text{-min}(e_n, h_n)$ s.t. $k_2 \leq k_f \leq k_1$ \quad (13)

Where, V-min means vector minimization, that is the sub-objective functions $e_n$ and $h_n$ for vector objective are as minimized as possible.

Using the linear weighted sum method, an evaluation function Q can be constructed as, min $Q = \alpha_1 e_n + \alpha_2 h_n$ s.t. $k_2 \leq k_f \leq k_1$ \quad (14)

Where, the weights of the evaluation function of chord error and scallop-height error, $\alpha_1$ and $\alpha_2$, are calculated as, $$\begin{cases} \alpha_1 = \frac{h_{n1} - h_{nmin}}{(e_{n1} - e_{nmin}) + (h_{n1} - h_{nmin})} \\ \alpha_2 = \frac{e_{n1} - e_{nmin}}{(e_{n1} - e_{nmin}) + (h_{n1} - h_{nmin})} \end{cases} \quad (15)$$

Where, $h_{n1}$ is the scallop-height error when the chord error is minimized and $e_{n1}$ is the chord error when the scallop-height error is minimized. $e_{n\,min}$ and $h_{n\,min}$ are the minimum values of the chord error and the scallop-height error.

The classified discussion by the value range of the principal curvature for the bi-objective optimization model is as followings.

(1) When $k_2 \geq 0$, assigned $k_f = k_2$, $e_n$ and $h_n$ are minimized simultaneously, thus, the optimal solution $k_f$ for the bi-objective optimization is $k_f = k_2$. By the Euler Theorem as, $$k_f = k_1 \cos^2\theta + k_2 \sin^2\theta \quad (16)$$

Where, $\theta$ is the angle between the feeding direction and the corresponding main direction. In this case, $$\theta = \frac{\pi}{2}.$$

(2) When $-k_1 \leq k_2 \leq 0$, the evaluation function Q is, $$Q = \frac{1}{k_1^2 + k_2^2 - k_1 k_2}(k_f^2 - k_2 k_f + k_2^2) \quad (17)$$

Assigned $$k_f = \frac{k_2}{2},$$

Q is minimized, thus, the optimal solution $k_f$ for the bi-objective optimization is $$k_f = \frac{k_2}{2}.$$

In this case, $$\theta = \arcsin\sqrt{\frac{k_2 - 2k_1}{2k_2 - 2k_1}}.$$

(3) When $0 \leq k_1 \leq -k_2$, the evaluation function Q is, $$Q = \frac{1}{k_1 - 2k_2}\left(-\frac{1}{k_2}k_f^2 + k_f - k_2\right) \quad (18)$$

Assigned $$k_f = \frac{k_2}{2},$$

Q is minimized, thus, the optimal solution $k_f$ for the bi-objective optimization is $$k_f = \frac{k_2}{2}.$$

In this case, $$\theta = \arcsin\sqrt{\frac{k_2 - 2k_1}{2k_2 - 2k_1}}.$$

(4) When $k_1 < 0$, the evaluation function Q is, $$Q = \frac{1}{2(k_2 - k_1)}\left(\frac{1}{k_2 + k_1}k_f^2 - k_f + k_2 - \frac{k_1^2}{k_2 + k_1}\right) \quad (19)$$

Assigned $$k_f = \frac{k_1 + k_2}{2},$$

Q is minimized, thus, the optimal solution $k_f$ for the bi-objective optimization is $$k_f = \frac{k_1 + k_2}{2},$$

In this case, $$\theta = \frac{\pi}{4}.$$

The arbitrary tangent vector direction is expressed as (du:dv), and the first fundamental form and the second fundamental form in this direction are defined as, $$\begin{cases} I = Edu^2 + 2Fdudv + Gdv^2 \\ II = Ldu^2 + 2Mdudv + Ndv^2 \end{cases} \quad (20)$$

Where, E, F and G are the first fundamental quantities for curved surface, and L, M and N are the second fundamental quantities for curved surface. They are expressed as, $$\begin{cases} E = S_u^2 \\ F = S_u \cdot S_v \\ G = S_v^2 \\ L = S_{uu} \cdot n \\ M = S_{uv} \cdot n \\ N = S_{vv} \cdot n \end{cases} \quad (21)$$

Where, $S_u$ and $S_v$ are first-order partial derivatives for curved surface S(u,v), $S_{uu}$, $S_{uv}$ and $S_{vv}$ second-order partial derivatives for curved surface S(u,v), n is the normal vector of the curved surface S(u,v).

Calculate the Optimal Tool Feeding Direction by Evaluation Function (S12)

The direction of the maximum normal curvature is expressed as $(du^1:dv^1)$, which is calculated as, $$\frac{du^1}{dv^1} = \frac{k_1 F - M}{L - k_1 E} \quad (22)$$

The direction of the optimal feeding direction is expressed as (du*:dv*), which is calculated as, $$\frac{du^*}{dv^*} = \frac{-b + \sqrt{b^2 - 4ac}}{2a} \quad (23)$$

Where, a, b and c are expressed as, $$\begin{cases} a = (F^2 - EG\cos^2\theta)\left(\frac{dv^1}{du^1}\right)^2 + 2EF\sin^2\theta\left(\frac{dv^1}{du^1}\right) + E^2\sin^2\theta \\ b = 2FG\sin^2\theta\left(\frac{dv^1}{du^1}\right)^2 + 2(EG + F^2\sin^2\theta - F^2\cos^2\theta)\left(\frac{dv^1}{du^1}\right) + 2EF\sin^2\theta \\ c = G^2\sin^2\theta\left(\frac{dv^1}{du^1}\right)^2 + 2FG\sin^2\theta\left(\frac{dv^1}{du^1}\right) + (F^2 - EG\cos^2\theta) \end{cases} \quad (24)$$

Solving Eqs. (22)-(24), the optimal feeding direction at each CCP is calculated, along which the unit feeding vector is established, and the vector filed under the constraint of chord error and scallop-height error is constructed.

Step Two (S2): Primary Surface Segmentation Based on Vector Field of Tool Feeding Direction Calculate the Divergence and Rotation of Vector Field by Vector Projecting (S21)

The expression of the vector field in the Cartesian coordinate system O-xyz is $F(\gamma)=(g_1(x,y,z),g_2(x,y,z),g_3(x,y,z))$ according to Step One, where $\gamma$ is the feeding vector in optimal feeding direction of each point on the surface. Projecting the space vector field into plane xOy, the two-dimensional unit feeding vector $\gamma^*$ in each optimal feeding direction is obtained, and the plane vector field is expressed as $A(\gamma^*)=(f_1(x,y),f_2(x,y))$. The optimal feeding directions have regional distribution feature in the constructed vector field of tool feeding direction for the complex curved surface. Focusing on the vector field constructed by feeding vectors with sub-regional distribution feature, the primary surface segmentation is achieved based on distribution of tool feeding vector.

According to the divergence and the rotation of the vector filed, the regional distribution feature of the feeding vectors can be confirmed. The divergence $divA(\gamma^*)$ at each point on the plane vector field $A(\gamma^*)=(f_1(x,y),f_2(x,y))$ is calculated as, $$divA(\gamma^*) = \nabla \cdot A(\gamma^*) = \frac{\partial f_1(x,y)}{\partial x} + \frac{\partial f_2(x,y)}{\partial y} \quad (25)$$

Where, $\nabla$ is the Hamilton operator.

The rotation $rotA(\gamma^*)$ at each point is calculated as, $$rotA(\gamma^*) = \nabla \times A(\gamma^*) = \left(\frac{\partial f_2(x,y)}{\partial x} - \frac{\partial f_1(x,y)}{\partial y}\right)k \quad (26)$$

Where, k is the unit vector in positive direction of z coordinate axis in Cartesian coordinate system.

Segment the Surface Based on the Tool Feeding Vector Distribution (S22)

Calculating the divergence and the rotation at each CCP on the curved surface, according to whether the values of the divergence and the rotation are zero or not, the plane vector field is divided into four categories.

(1) Irrotational Divergence-Free Vector Field

All the values of divergence and rotation are zero in such plane vector field, and the distribution feature of these feeding vectors is parallel.

(2) Rotational Vector Field

All the values of divergence are zero but the values of rotation are nonzero in such plane vector field, and the distribution feature of these feeding vectors is swirling.

(3) Divergence Vector Field

All the values of rotation are zero but the values of divergence are nonzero in such plane vector field, and the distribution feature of these feeding vectors is radialized.

(4) Rotational Divergence Vector Field

All the values of divergence and rotation are nonzero in such plane vector field, and the distribution feature of these feeding vectors is disorderly.

Calculating the values of the divergence and the rotation for the plane vector field, the projected plane vector field categories of different sub-regions are confirmed. Mapping the abrupt change points onto the machining region of the complex curved surface and fitting curve as boundaries for different sub-regions, the primary surface segmentation based on the vector field of tool feeding direction is achieved.

Step Three: Surface Subdivision for Guaranteeing Stability of Feed Motion (S3)

Calculate the Kinematics Parameters Along the Fitted Streamlines of Space Vector Field (S31)

According to the primary surface segmentation in Step Two, the streamlines in different sub-regions can be fitted by the space vector field. The surface subdivision is carried out based on the kinematics parameters when axes of machine tool feed along the space vector field streamlines, which guarantees the stability of feed motion.

The five-axis CNC machine with AC Type dual rotary table is taken as an example, whose rotation axis of the rotary table A is parallel to the X-axis of the machine coordinate system and the rotation axis of the rotary table C is parallel to the Z-axis of the machine coordinate system. The vector field streamline in the machining region is set as $r(\xi)$, where $\xi$ is the parameter by arc length of the streamline equation. The tool orientation $n(\xi)=(n_x(\xi), n_y(\xi), n_z(\xi))$ which is the normal vector of the streamline on the sub-region of the complex curved surface is calculated as, $$n(\xi) = \frac{S_u(u(\xi), v(\xi)) \times S_v(u(\xi), v(\xi))}{|S_u(u(\xi), v(\xi)) \times S_v(u(\xi), v(\xi))|} \tag{27}$$

Where, $S_u(u(\xi),v(\xi))$ and $S_v(u(\xi),v(\xi))$ are the first-order partial derivative in the streamline of the complex curved surface $S(u,v)$.

According to the tool orientations at each point on the streamline, the rotation angles of A-axis and C-axis of the machine tool are calculated as, $$\begin{cases} \beta_A(\xi) = \arctan\left(\frac{\sqrt{n_x(\xi)^2 + n_y(\xi)^2}}{n_z}\right) \\ \beta_C(\xi) = \arctan\left(\frac{n_x(\xi)}{n_y(\xi)}\right) \end{cases} \tag{28}$$

Based on Eqs. (27) and (28), the angular velocities of the A-axis and the C-axis of machine tool feeding along the streamline are calculated as, $$\begin{cases} \omega_A(\xi) = \frac{d\beta_A(\xi)}{dt} = \frac{d\xi}{dt} \cdot \frac{d\beta_A(\xi)}{d\xi} = v \cdot \frac{d\beta_A(\xi)}{d\xi} \\ \omega_C(\xi) = \frac{d\beta_C(\xi)}{dt} = \frac{d\xi}{dt} \cdot \frac{d\beta_C(\xi)}{d\xi} = v \cdot \frac{d\beta_C(\xi)}{d\xi} \end{cases} \tag{29}$$

Where, t is the processing time and v is the feed speed set.

The angular accelerations of the A-axis and the C-axis of machine tool feeding along the streamline are calculated as, $$\begin{cases} \alpha_A(\xi) = \frac{d\omega_A(\xi)}{dt} = v^2 \cdot \frac{d^2\beta_A(\xi)}{d\xi^2} \\ \alpha_C(\xi) = \frac{d\omega_c(\xi)}{dt} = v^2 \cdot \frac{d^2\beta_C(\xi)}{d\xi^2} \end{cases} \tag{30}$$

The angular velocities $\omega(\xi)$ and the angular accelerations $\alpha(\xi)$ of the rotation axes of the machine tool are calculated as, $$\begin{cases} |\omega(\xi)| = \sqrt{\omega_A(\xi)^2 + \omega_C(\xi)^2} \\ |\alpha(\xi)| = \sqrt{\alpha_A(\xi)^2 + \alpha_C(\xi)^2} \end{cases} \tag{31}$$

Surface Subdivision for Feed Motion Stability (S32)

In order to avoid obvious cutting vibration when the rotation axes of machine tool feed along the streamlines, the angular velocities and the angular accelerations in sub-regions should meet the requirements as, $$\begin{cases} \left|\frac{d\omega(\xi)}{d\xi}\right| \leq \frac{\sigma}{s} \int_0^s \left|\frac{d\omega(\xi)}{d\xi}\right| d\xi \\ \left|\frac{d\alpha(\xi)}{d\xi}\right| \leq \frac{\sigma}{s} \int_0^s \left|\frac{d\alpha(\xi)}{d\xi}\right| d\xi \end{cases} \tag{32}$$

Where, σ is a stability coefficient to be set from 1 to 5, which is proportional to the feeding motion stability, and s is the total arc length of the streamline.

Evaluating the feeding motion stability by Eq. (32), take the points which are not fit this Eq. as the abrupt change points. Based on the primary surface segmentation and fitting these abrupt change points in sub-regions as new boundaries, the surface subdivision which guarantees the feeding motion stability is finished.

Step Four: Design of Sub-Regional Toolpath Topology for Curved Surface (S4)

The complex curved surface can be segmented and subdivided into different sub-regions where the feeding vectors are in regular distribution feature and the feeding motion stability is guaranteed when axes of machine tool feed along the space vector field streamlines according to Step Two and Step Three.

Based on the plane field type in different sub-regions, two frequently-used toolpath modes, direction-parallel machining and contour-parallel machining are designed on the plane fields projected by corresponding sub-regions as followings.

(1) Irrotational Divergence-Free Vector Field

The feeding vectors in such plane vector field present a parallel form, thus, the direction-parallel machining is designed. Fitting the vectors at each point as streamlines, the direction-parallel toolpaths are generated.

(2) Rotational Vector Field

The feeding vectors in such plane vector field present as the vorticity form. When the boundaries of sub-regions are parallel to corresponding vector field streamlines, the streamlines are closed vortex lines and the contour-parallel machining is designed. When the boundaries of sub-regions are not parallel to corresponding vector field streamlines, the streamlines are incomplete vortex lines as the circle regions, and the direction-parallel machining is designed. Taking the vector at each point as the tangent direction of the toolpath and fitting the streamline, the gyrate toolpaths are generated.

(3) Divergence Vector Field

The feeding vectors in such plane vector field present a radial form, thus, the direction-parallel machining is designed. Taking the vector at each point as the tangent direction of the toolpath and fitting the streamline, the radial toolpaths are generated.

(4) Rotational Divergence Vector Field

Due to the feature of disorderly distribution, the machining sub-region of the rotational divergence vector field is unpractical for direction-parallel or contour-parallel machining. Hence, the rotational divergence vector field need to be converted into irrotational divergence-free vector field. Based on the parallel form presented by the irrotational divergence-free vector field, the feeding vectors in rotational divergence vector field are modified as followings.

Taking m unit feeding vectors from the rotational divergence vector field $B(\gamma^*)=(f_1(x,y),f_2(x,y))$ to be converted, the vectors are respectively expressed as $B(\gamma_i^*)=(f_1(x_i,y_i),f_2(x_i,y_i))$, where $i=1, 2, \ldots, m$. The average of feeding vectors $\overline{B}(\gamma^*)$ is taken as the feeding vector in modified rotational divergence vector field, calculated as, $$\overline{B}(\gamma^*) = \left( \cos\left[\frac{1}{m}\sum_{i=1}^{m}\arccos f_1(x_i, y_i)\right], \sin\left[\frac{1}{m}\sum_{i=1}^{m}\arccos f_1(x_i, y_i)\right] \right) \quad (33)$$

Taking the modified vector at each point as the tangent direction of the toolpath and fitting the streamline, the direction-parallel toolpaths are generated.

Designing the plane toolpath topologies on plane fields corresponded with different sub-regions and mapping the plane toolpaths onto the machining region for curved surface, the space toolpaths are generated and the toolpath topology design in sub-regional processing based on vector field is realized.

The five-axis CNC machine with AC Type dual rotary table is used in the embodiment and a complex surface with geometric feature of high-gradient and multiple-concave-convex, which just has rapidly changed curvature geometric feature, is modelled as an example by the software UG NX and the software MATLAB to describe the implementation process of the invention in detail.

Figure 2:
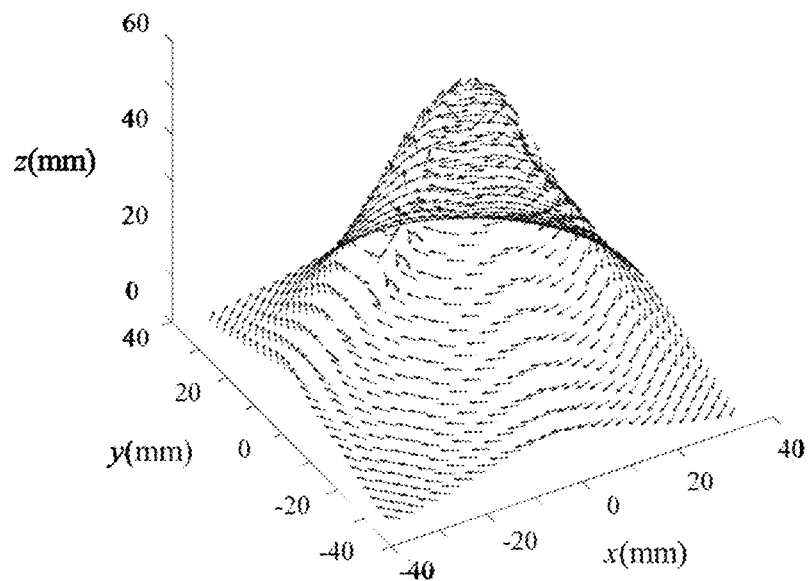
FIG. 2: Vector field with constraint of chord error and scallop-height error.

First, model the complex curved surface by software UG NX. The surface is formed as a rotationally symmetrical surface with local gradient of 60° and two irregular pits designed so that the complex surface with geometric feature of high-gradient, multiple-concave-convex and rapidly changed curvature geometric feature is modelled. The functional relationships between the normal curvature in feeding direction and the two errors are established using Eq. (1)-(5) and the two errors are normalized using Eq. (6)-(12). Based on the software MATLAB, the bi-objective optimization model and its evaluation function are constructed and the optimal feeding direction of each point on the surface are calculated using Eq. (13)-(24). FIG. 2 is the constructed vector field with constraint of chord error and scallop-height error.

Second, the space vector field is projected into a plane vector field. By the software MATLAB, the divergence and the rotation of each point on the plane vector field are calculated using Eq. (25) and (26), where the maximum and the minimum of the divergence are 0.2299 and 0, and the maximum and the minimum of the rotation are 0.1191 and 0.0045. According to whether the divergence and the rotation are zeros or not to classify different sub-regions, the primary surface segmentation for this complex curved surface is achieved based on sub-regional boundaries fitting by points where the divergence or the rotation abrupt changes. In which, sub-regions of pit are corresponded with the rotational divergence vector field and other sub-regions are corresponded with the irrotational divergence-free vector field.

Figure 3:
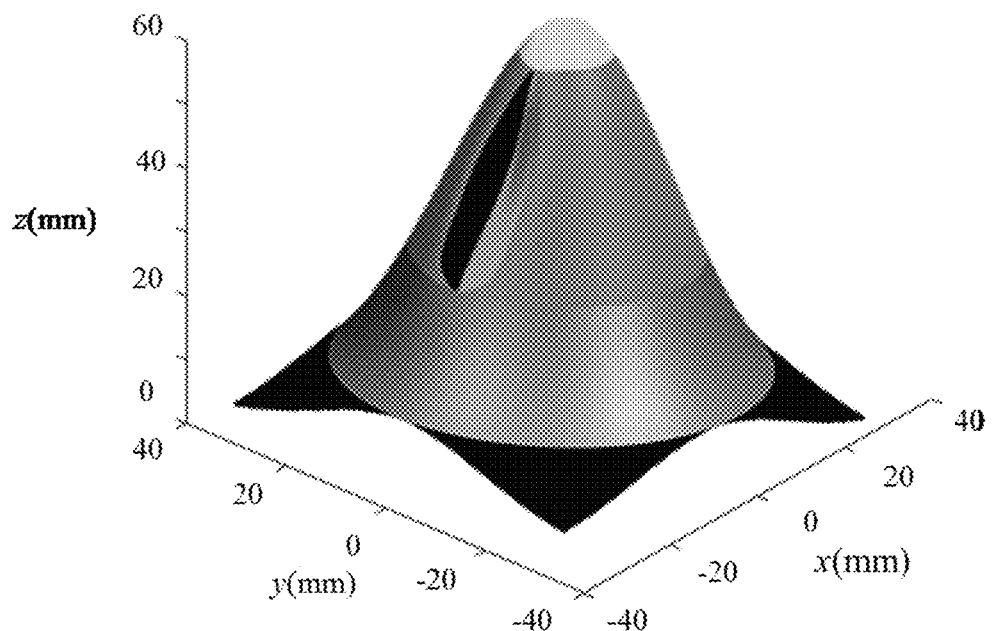
FIG. 3: Sub-regions by primary surface segmentation based on feeding vector distribution feature and surface subdivision which guarantees stability of feed motion.

Then, using function streamslice of the software MATLAB to fit the space vectors as streamlines, the angular velocities and the angular accelerations of the A-axis of the machine tool feeding along the streamlines are calculated using Eq. (27)-(31). In the sub-regions of two pits, the maximum angular velocity is 16.56°/s and the maximum angular acceleration is 864.29°/s². Setting the stability coefficient as 2 according to Eq. (32), the new boundaries for surface subdivision are fitted by points with the abrupt change of angular velocity or angular acceleration and the surface subdivision for this complex curved surface is finished. FIG. 3 is the final result of surface segmentation.

Finally, referring to the frequently-used direction-parallel machining and contour-parallel machining, the sub-regional toolpath topologies are designed. The sub-regions of pit of this complex curved surface are corresponded with the rotational divergence vector field where the feeding vectors are modified using Eq. (33) and toolpath with direction-parallel topology is designed as shown in FIG. 4, and other sub-regions are corresponded with the irrotational divergence-free vector field, where the proper toolpath topology for direction-parallel machining and contour-parallel machining are designed considered with sub-regional boundaries and streamlines. The sub-regional toolpath topology design based on vector field for the complex curved surface is finished.

In order to verify the effectiveness of the proposed method, a comparison experiment between conventional processing and proposed sub-regional processing is carried out. The same machining parameters are taken in comparison experiment, where the spindle speed is 5000 r/min, the cutting depth is 0.25 mm, the feed rate is 300 mm/min, the side-step is 0.2 mm, and the step-size is 1.8 mm. The experimental results show that processing by the proposed method can effectively improve the processing quality of the complex curved surface parts compared with the parts processed by the conventional global processing method. The machining region at a same height of 20 mm from the top of the workpiece is taken as example, where the surface toughness and surface profile error are measured. The surface roughness of the complex curved surface obtained by the global processing is 4.7384 m, and the surface roughness of the complex curved surface obtained by the proposed method is 3.6715 m, which is 22.52% lower than the global processing. FIG. 5 show the measurement results, in which 5-$a$) is the surface roughness by conventional global processing method and 5-$b$) is the surface roughness by proposed sub-regional processing method. The surface profile error of the surface obtained by the conventional global processing is 153.6 m, and that of the surface obtained by the proposed method is 91.84 m, which is 40.21% lower than the global processing as shown in FIG. 6. The judgment results are consistent with the experimental results, so it is verified that processing by the proposed design method of toolpath topology based on the vector field of tool feeding direction in sub-regional processing can effectively reduce the processing error and improve the processing quality of the complex curved surface parts, which provides important guidance for the toolpath generation in engineering practice.

The invention claimed is:

1. A toolpath topology design method based on vector field in sub-regional processing for the curved surface, wherein, first, finding the functional relationships in feeding direction between the chord error and the normal curvature and between the scallop-height error and the normal curvature, after normalization, establishing the bi-objective optimization model and calculating the optimal feeding direction at each cutting contact point within the surface through the constructed evaluation function, the space vector field is built, second, calculating divergence and rotation of the projected vector field and according to whether them are zeros or not to classify different sub-regions, the primary surface segmentation is achieved, third, after analyzing the feature of different vector fields and fitting of the streamline by feeding vectors, the kinematics parameters of when the rotational axes of machine tool feed along the streamlines are calculated and the surface subdivision is finished by judging the abrupt change of the kinematics parameters, finally, different sub-regional toolpath topologies for machining region are designed based on toolpath modes; the detail procedure is as follows:

step one: vector field construction for tool feeding direction with constraint of chord error and scallop-height error the machining surface region can be defined as $S(u,v)=(x(u,v),y(u,v),z(u,v))$ in the Cartesian coordinate system O-xyz, where u and v are parameters for curved surface; when d and f are the determined step-size and step-size, the chord error e at any cutting contact point on the toolpath for curved surface is calculated as, $$e = \begin{cases} 0, & k_f = 0 \\ \frac{1}{|k_f|} - \sqrt{\frac{1}{k_f^2} - \frac{f^2}{4}}, & k_f \neq 0 \end{cases} \quad (1)$$

where, $k_f$ is the normal curvature in feeding direction; the new variable e* is set as, $$e^* = k_f^2 \quad (2)$$

solving the monotonicity of the chord error e and the new variable e* respectively, it can be seen that they are positively correlated, and therefore the chord error is substituted by e* in order to reduce the difficulty of subsequent calculations;

the scallop-height error h is calculated as, $$h = -\frac{d^2}{8}k_d + \frac{d^2}{8r} \quad (3)$$

where, $k_d$ is the normal curvature in side-step direction and r is the effective milling cutter radius;

the feeding direction and the side-step direction are perpendicular to each other and according to the differential geometry, they satisfy Eq. (4), $$k_d + k_f = 2H \quad (4)$$

where, H is the average curvature which is constant for any point within a certain complex curved surface;

by solving Eqs. (3)-(4), the scallop-height error can also be written as, $$h = \frac{d^2}{8}k_f + \frac{d^2 - 2Hrd^2}{8r} \quad (5)$$

according to Eqs. (2) and (5), given step-size and side-step, the values of the chord error and the scallop-height error are determined only by the normal curvature in feeding direction; in order to calculate the optimal feeding direction at each cutting contact point, the bi-objective optimization model is constructed taking two types of error as objective function;

the two types of error should be normalized as, $$\begin{cases} e_n = \frac{e^* - e^*_{min}}{e^*_{max} - e^*_{min}} \\ h_n = \frac{h - h_{min}}{h_{max} - h_{min}} \end{cases} \quad (6)$$

where, $e_n$ and $h_n$ are the normalized chord error and the normalized scallop-height error, $e^*_{min}$ and $e^*_{max}$ are the minimum and maximum of the chord error, and $h_{min}$ and $h_{max}$ are the minimum and maximum of the scallop-height error; the calculations for them are as followings:

the principal curvatures of the complex curved surface are represented as $k_1$ and $k_2$ ($k_1 > k_2$), which can be expressed as, $$\begin{cases} k_1 = H + \sqrt{H^2 - K} \\ k_2 = H - \sqrt{H^2 - K} \end{cases} \quad (7)$$

where, K is the Gaussian curvature which is constant for any cutting contact point on a certain curved surface; according to Eqs. (2) and (5), the maximum and the minimum of the scallop-height error are calculated as, $$\begin{cases} h_{max} = \frac{d^2}{8}k_1 + \frac{d^2 - 2Hrd^2}{8r} \\ h_{min} = \frac{d^2}{8}k_2 + \frac{d^2 - 2Hrd^2}{8r} \end{cases} \quad (8)$$

the maximum of the chord error is calculated as, $$e^*_{max} = \begin{cases} k_1^2, & k_2 \geq 0 \\ k_1^2, & -k_1 \leq k_2 < 0 \\ k_2^2, & 0 \leq k_1 < -k_2 \\ k_2^2, & k_1 < 0 \end{cases} \quad (9)$$

the minimum of the chord error is calculated as, $$e_{min}^* = \begin{cases} k_2^2 & , k_2 \geq 0 \\ 0 & , -k_1 \leq k_2 < 0 \\ 0 & , 0 \leq k_1 < -k_2 \\ k_1^2 & , k_1 < 0 \end{cases} \quad (10)$$

by solving Eqs. (6)-(10), the normalized scallop-height error $h_n$ is calculated as, $$h_n = \frac{1}{k_1 - k_2} k_f - \frac{k_2}{k_1 - k_2} \quad (11)$$

the normalized chord error $e_n$ is calculated as, $$e_n = \begin{cases} \dfrac{1}{k_1^2 - k_2^2} k_f^2 - \dfrac{k_2^2}{k_1^2 - k_2^2} & , k_2 \geq 0 \\ \dfrac{1}{k_1^2} k_f^2 & , -k_1 \leq k_2 < 0 \\ \dfrac{1}{k_2^2} k_f^2 & , 0 \leq k_1 < -k_2 \\ \dfrac{1}{k_2^2 - k_1^2} k_f^2 - \dfrac{k_1^2}{k_2^2 - k_1^2} & , k_1 < 0 \end{cases} \quad (12)$$

the normalized errors are used, the bi-objective optimization model taking two types of error as objective function is constructed as, $$V - \min(e_n, h_n) \quad (13)$$
$$\text{s.t. } k_2 \leq k_f \leq k_1$$

where, V-min means vector minimization, that is the sub-objective functions $e_n$ and $h_n$ for vector objective are as minimized as possible;

using the linear weighted sum method, an evaluation function Q can be constructed as, $$\min Q = \alpha_1 e_n + \alpha_2 h_n$$
$$\text{s.t. } k_2 \leq k_f \leq k_1 \quad (14)$$

where, the weights of the evaluation function of chord error and scallop-height error, $\alpha_1$ and $\alpha_2$, are calculated as, $$\begin{cases} \alpha_1 = \dfrac{h_{n1} - h_{n\,min}}{(e_{n1} - e_{n\,min}) + (h_{n1} - h_{n\,min})} \\ \alpha_2 = \dfrac{e_{n1} - e_{n\,min}}{(e_{n1} - e_{n\,min}) + (h_{n1} - h_{n\,min})} \end{cases} \quad (15)$$

where, $h_{n1}$ is the scallop-height error when the chord error is minimized and $e_{n1}$ is the chord error when the scallop-height error is minimized; $e_{n\,min}$ and $h_{n\,min}$ are the minimum values of the chord error and the scallop-height error;

the classified discussion by the value range of the principal curvature for the bi-objective optimization model is as followings;

(1) when $k_2 \geq 0$, assigned $k_f = k_2$, $e_n$ and $h_n$ are minimized simultaneously, thus, the optimal solution $k_f$ for the bi-objective optimization is $k_f = k_2$; by the Euler Theorem as, $$k_f = k_1 \cos^2\theta + k_2 \sin^2\theta \quad (16)$$

where, $\theta$ is the angle between the feeding direction and the corresponding main direction; in this case, $$\theta = \frac{\pi}{2};$$

(2) when $-k_1 \leq k_2 < 0$, the evaluation function Q is, $$Q = \frac{1}{k_1^2 + k_2^2 - k_1 k_2}(k_f^2 - k_2 k_f + k_2^2) \quad (17)$$

assigned $$k_f = \frac{k_2}{2},$$

Q is minimized, thus, the optimal solution $k_f$ for the bi-objective optimization is $$k_f = \frac{k_2}{2};$$

in this case, $$\theta = \arcsin\sqrt{\frac{k_2 - 2k_1}{2k_2 - 2k_1}};$$

(3) when $0 \leq k_1 < -k_2$, the evaluation function Q is, $$Q = \frac{1}{k_1 - 2k_2}\left(-\frac{1}{k_2}k_f^2 + k_f - k_2\right) \quad (18)$$

assigned $$k_f = \frac{k_2}{2},$$

Q is minimized, thus, the optimal solution $k_f$ for the bi-objective optimization is $$k_f = \frac{k_2}{2};$$

in this case, $$\theta = \arcsin\sqrt{\frac{k_2 - 2k_1}{2k_2 - 2k_1}};$$

(4) when $k_1 < 0$, the evaluation function Q is, $$Q = \frac{1}{2(k_2 - k_1)}\left(\frac{1}{k_2 + k_1}k_f^2 - k_f + k_2 - \frac{k_1^2}{k_2 + k_1}\right) \quad (19)$$

assigned $$k_f = \frac{k_1 + k_2}{2},$$

Q is minimized, thus, the optimal solution $k_f$ for the bi-objective optimization is $$k_f = \frac{k_1 + k_2}{2};$$

in this case, $$\theta = \frac{\pi}{4};$$

the arbitrary tangent vector direction is expressed as (du:dv), and the first fundamental form and the second fundamental form in this direction are defined as, $$\begin{cases} I = Edu^2 + 2Fdudv + Gdv^2 \\ II = Ldu^2 + 2Mdudv + Ndv^2 \end{cases} \quad (20)$$

where, E, F and G are the first fundamental quantities for curved surface, and L, M and N are the second fundamental quantities for curved surface; they are expressed as, $$\begin{cases} E = S_u^2 \\ F = S_u \cdot S_v \\ G = S_v^2 \\ L = S_{uu} \cdot n \\ M = S_{uv} \cdot n \\ N = S_{vv} \cdot n \end{cases} \quad (21)$$

where, $S_u$ and $S_v$ are first-order partial derivatives for curved surface $S(u,v)$, $S_{uu}$, $S_{uv}$ and $S_{vv}$ second-order partial derivatives for curved surface $S(u,v)$, n is the normal vector of the curved surface $S(u,v)$;

the direction of the maximum normal curvature is expressed as $(du^1:dv^1)$, which is calculated as, $$\frac{du^1}{dv^1} = \frac{k_1 F - M}{L - k_1 E} \quad (22)$$

the direction of the optimal feeding direction is expressed as $(du^*:dv^*)$, which is calculated as, $$\frac{du^*}{dv^*} = \frac{-b + \sqrt{b^2 - 4ac}}{2a} \quad (23)$$

where, a, b and c are expressed as, $$\begin{cases} a = (F^2 - EG\cos^2\theta)\left(\frac{dv^1}{du^1}\right)^2 + 2EF\sin^2\theta\left(\frac{dv^1}{du^1}\right) + E^2\sin^2\theta \\ b = 2FG\sin^2\theta\left(\frac{dv^1}{du^1}\right)^2 + 2(EG + F^2\sin^2\theta - F^2\cos^2\theta)\left(\frac{dv^1}{du^1}\right) + \\ 2EF\sin^2\theta \\ c = G^2\sin^2\theta\left(\frac{dv^1}{du^1}\right)^2 + 2FG\sin^2\theta\left(\frac{dv^1}{du^1}\right) + (F^2 - EG\cos^2\theta) \end{cases} \quad (24)$$

solving Eqs. (22)-(24), the optimal feeding direction at each cutting contact point is calculated, along which the unit feeding vector is established, and the vector filed under the constraint of chord error and scallop-height error is constructed;

step two: primary surface segmentation based on vector field of tool feeding direction the expression of the vector field in the Cartesian coordinate system O-xyz is $F(\gamma) = (g_1(x,y,z), g_2(x,y,z), g_3(x,y,z))$—according to step one, where $\gamma$ is the feeding vector in optimal feeding direction of each point on the surface; projecting the space vector field into plane xOy, the two-dimensional unit feeding vector $\gamma^*$ in each optimal feeding direction is obtained, and the plane vector field is expressed as $A(\gamma^*) = (f_1(x,y), f_2(x,y))$; the optimal feeding directions have regional distribution feature in the constructed vector field of tool feeding direction for the complex curved surface; focusing on the vector field constructed by feeding vectors with sub-regional distribution feature, the primary surface segmentation is achieved based on distribution of tool feeding vector;

according to the divergence and the rotation of the vector filed, the regional distribution feature of the feeding vectors can be confirmed; the divergence $divA(\gamma^*)$ at each point on the plane vector field $A(\gamma^*) = (f_1(x,y), f_2(x,y))$ is calculated as, $$divA(\gamma^*) = \nabla \cdot A(\gamma^*) = \frac{\partial f_1(x,y)}{\partial x} + \frac{\partial f_2(x,y)}{\partial y} \quad (25)$$

where, $\nabla$ is the Hamilton operator;
the rotation $rotA(\gamma^*)$ at each point is calculated as, $$rotA(\gamma^*) = \nabla \times A(\gamma^*) = \left(\frac{\partial f_2(x,y)}{\partial x} - \frac{\partial f_1(x,y)}{\partial y}\right)k \quad (26)$$

where, k is the unit vector in positive direction of z coordinate axis in Cartesian coordinate system;

calculating the divergence and the rotation at each cutting contact point on the curved surface, according to whether the values of the divergence and the rotation are zero or not, the plane vector field is divided into four categories;

(1) irrotational divergence-free vector field
all the values of divergence and rotation are zero in such plane vector field, and the distribution feature of these feeding vectors is parallel;
(2) rotational vector field
all the values of divergence are zero but the values of rotation are nonzero in such plane vector field, and the distribution feature of these feeding vectors is swirling;
(3) divergence vector field
all the values of rotation are zero but the values of divergence are nonzero in such plane vector field, and the distribution feature of these feeding vectors is radialized;
(4) rotational divergence vector field
all the values of divergence and rotation are nonzero in such plane vector field, and the distribution feature of these feeding vectors is disorderly;
calculating the values of the divergence and the rotation for the plane vector field, the projected plane vector field categories of different sub-regions are confirmed; mapping the abrupt change points onto the machining region of the complex curved surface and fitting curve as boundaries for different sub-regions, the primary surface segmentation based on the vector field of tool feeding direction is achieved;

step three: surface subdivision for guaranteeing stability of feed motion
according to the primary surface segmentation in step two, the streamlines in different sub-regions can be fitted by the space vector field; the surface subdivision is carried out based on the kinematics parameters when axes of machine tool feed along the space vector field streamlines, which guarantees the stability of feed motion;
the rotation axis of the rotary table A of five-axis Computer Numerical Control (CNC) machine with AC Type dual rotary table is parallel to the X-axis of the machine coordinate system and the rotation axis of the rotary table C is parallel to the Z-axis of the machine coordinate system; the vector field streamline in the machining region is set as $r(\xi)$, where $\xi$ is the parameter by arc length of the streamline equation; the tool orientation $n(\xi)=(n_x(\xi),n_y(\xi),n_z(\xi))$ which is the normal vector of the streamline on the sub-region of the complex curved surface is calculated as, $$n(\xi) = \frac{S_u(u(\xi), v(\xi)) \times S_v(u(\xi), v(\xi))}{|S_u(u(\xi), v(\xi)) \times S_v(u(\xi), v(\xi))|} \qquad (27)$$

where, $S_u(u(\xi),v(\xi))$ and $S_v(u(\xi),v(\xi))$ are the first-order partial derivative in the streamline of the complex curved surface $S(u,v)$;
according to the tool orientations at each point on the streamline, the rotation angles of A-axis and C-axis of the machine tool are calculated as, $$\begin{cases} \beta_A(\xi) = \arctan\left(\frac{\sqrt{n_x(\xi)^2 + n_y(\xi)^2}}{n_z}\right) \\ \beta_C(\xi) = \arctan\left(\frac{n_x(\xi)}{n_y(\xi)}\right) \end{cases} \qquad (28)$$

based on Eqs. (27) and (28), the angular velocities of the A-axis and the C-axis of machine tool feeding along the streamline are calculated as, $$\begin{cases} \omega_A(\xi) = \frac{d\beta_A(\xi)}{dt} = \frac{d\xi}{dt} \cdot \frac{d\beta_A(\xi)}{d\xi} = v \cdot \frac{d\beta_A(\xi)}{d\xi} \\ \omega_C(\xi) = \frac{d\beta_C(\xi)}{dt} = \frac{d\xi}{dt} \cdot \frac{d\beta_C(\xi)}{d\xi} = v \cdot \frac{d\beta_C(\xi)}{d\xi} \end{cases} \qquad (29)$$

where, t is the processing time and v is the feed speed set;
the angular accelerations of the A-axis and the C-axis of machine tool feeding along the streamline are calculated as, $$\begin{cases} \alpha_A(\xi) = \frac{d\omega_A(\xi)}{dt} = v^2 \cdot \frac{d^2\beta_A(\xi)}{d\xi^2} \\ \alpha_C(\xi) = \frac{d\omega_C(\xi)}{dt} = v^2 \cdot \frac{d^2\beta_C(\xi)}{d\xi^2} \end{cases} \qquad (30)$$

the angular velocities $\omega(\xi)$ and the angular accelerations $\alpha(\xi)$ of the rotation axes of the machine tool are calculated as, $$\begin{cases} |\omega(\xi)| = \sqrt{\omega_A(\xi)^2 + \omega_C(\xi)^2} \\ |\alpha(\xi)| = \sqrt{\alpha_A(\xi)^2 + \alpha_C(\xi)^2} \end{cases} \qquad (31)$$

in order to avoid obvious cutting vibration when the rotation axes of machine tool feed along the streamlines, the angular velocities and the angular accelerations in sub-regions should meet the requirements as, $$\begin{cases} \left|\frac{d\omega(\xi)}{d\xi}\right| \leq \frac{\sigma}{s} \int_0^s \left|\frac{d\omega(\xi)}{d\xi}\right| d\xi \\ \left|\frac{d\alpha(\xi)}{d\xi}\right| \leq \frac{\sigma}{s} \int_0^s \left|\frac{d\alpha(\xi)}{d\xi}\right| d\xi \end{cases} \qquad (32)$$

where, $\sigma$ is a stability coefficient to be set from 1 to 5, which is proportional to the feeding motion stability, and s is the total arc length of the streamline;
evaluating the feeding motion stability by Eq. (32), take the points which are not fit this Eq. as the abrupt change points; based on the primary surface segmentation and fitting these abrupt change points in sub-regions as new boundaries, the surface subdivision which guarantees the feeding motion stability is finished;
step four: design of sub-regional toolpath topology for curved surface
the complex curved surface can be segmented and subdivided into different sub-regions where the feeding vectors are in regular distribution feature and the feeding motion stability is guaranteed when axes of machine tool feed along the space vector field streamlines according to Step Two and Step Three;
based on the plane field type in different sub-regions, two frequently-used toolpath modes, direction-parallel machining and contour-parallel machining are designed on the plane fields projected by corresponding sub-regions as followings;
(1) irrotational divergence-free vector field
the feeding vectors in such plane vector field present a parallel form, thus, the direction-parallel machining is designed; fitting the vectors at each point as streamlines, the direction-parallel toolpaths are generated;

(2) rotational vector field
the feeding vectors in such plane vector field present as the vorticity form; when the boundaries of sub-regions are parallel to corresponding vector field streamlines, the streamlines are closed vortex lines and the contour-parallel machining is designed; when the boundaries of sub-regions are not parallel to corresponding vector field streamlines, the streamlines are incomplete vortex lines as the circle regions, and the direction-parallel machining is designed; taking the vector at each point as the tangent direction of the toolpath and fitting the streamline, the gyrate toolpaths are generated;

(3) divergence vector field
the feeding vectors in such plane vector field present a radial form, thus, the direction-parallel machining is designed; taking the vector at each point as the tangent direction of the toolpath and fitting the streamline, the radial toolpaths are generated;

(4) rotational divergence vector field
due to the feature of disorderly distribution, the machining sub-region of the rotational divergence vector field is unpractical for direction-parallel or contour-parallel machining; hence, the rotational divergence vector field need to be converted into irrotational divergence-free vector field; based on the parallel form presented by the irrotational divergence-free vector field, the feeding vectors in rotational divergence vector field are modified as followings;

taking m unit feeding vectors from the rotational divergence vector field $B(\gamma^*)=(f_1(x,y),f_2(x,y))$ to be converted, the vectors are respectively expressed as $B(\gamma_i^*)=(f_1(x_i,y_i),f_2(x_i,y_i))$, where $i=1, 2, \ldots, m$; the average of feeding vectors $\overline{B}(\gamma^*)$ is taken as the feeding vector in modified rotational divergence vector field, calculated as, $$\overline{B}(\gamma^*) = \left( \cos\left[\frac{1}{m}\sum_{i=1}^{m} \arccos f_1(x_i, y_i)\right], \sin\left[\frac{1}{m}\sum_{i=1}^{m} \arccos f_1(x_i, y_i)\right] \right) \quad (33)$$

taking the modified vector at each point as the tangent direction of the toolpath and fitting the streamline, the direction-parallel toolpaths are generated;

designing the plane toolpath topologies on plane fields corresponded with different sub-regions and mapping the plane toolpaths onto the machining region for curved surface, the space toolpaths are generated and the toolpath topology design in sub-regional processing based on vector field is realized.

* * * * *